US012321135B2

(12) United States Patent
Mouche et al.

(10) Patent No.: US 12,321,135 B2
(45) Date of Patent: Jun. 3, 2025

(54) DEVICE FOR FASTENING A DISC

(71) Applicant: ETA SA Manufacture Horlogere Suisse, Grenchen (CH)

(72) Inventors: Laurent Mouche, Les Genevez (CH); Pascal Lagorgette, Bienne (CH); Raphaël Balmer, Vicques (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 471 days.

(21) Appl. No.: 17/775,956

(22) PCT Filed: Nov. 5, 2020

(86) PCT No.: PCT/EP2020/081189
§ 371 (c)(1),
(2) Date: May 11, 2022

(87) PCT Pub. No.: WO2021/094197
PCT Pub. Date: May 20, 2021

(65) Prior Publication Data
US 2022/0390897 A1    Dec. 8, 2022

(30) Foreign Application Priority Data
Nov. 13, 2019  (EP) ..................... 19208899

(51) Int. Cl.
*G04B 19/14*   (2006.01)
*G04B 19/20*   (2006.01)
(Continued)

(52) U.S. Cl.
CPC ........... *G04B 19/14* (2013.01); *G04B 19/202* (2013.01); *G04B 19/247* (2013.01); *G04C 17/0058* (2013.01)

(58) Field of Classification Search
CPC .... G04B 19/14; G04B 19/202; G04B 19/247; G04C 17/0058; F16B 5/0258
See application file for complete search history.

(56) References Cited

U.S. PATENT DOCUMENTS 2,737,010 A * 3/1956 Piquerez .............. G04B 37/084
  368/291
2,858,663 A * 11/1958 Schwarz ................ G04B 37/11
  368/286

(Continued)

FOREIGN PATENT DOCUMENTS

CH    706 764 A2   1/2014
CN    1068431 A    1/1993
(Continued)

OTHER PUBLICATIONS

Japanese Notice of the Reason for Refusal issued Apr. 25, 2023 in Japanese Patent Application No. 2022-521102 (with English Translation), 14 pages.

(Continued)

*Primary Examiner* — Edwin A. Leon
*Assistant Examiner* — Sean R Brannon
(74) *Attorney, Agent, or Firm* — Oblon, McClelland, Maier & Neustadt, L.L.P.

(57) ABSTRACT

A fastening method is for fastening at least one display element of a watch using a fastening device. Indeed, the at least one display element is fastened thanks to the fastening method via the fastening device. For this, it is necessary to provide the at least one display element, at least one movement, and at least one split ring, then to deform the at least one split ring so as to adapt to the at least one display element before fastening the at least one split ring with the at least one display element to the at least one movement.

8 Claims, 1 Drawing Sheet

(51) Int. Cl.
  *G04B 19/247* (2006.01)
  *G04C 17/00* (2006.01)

(56) References Cited

U.S. PATENT DOCUMENTS

| | | | |
|---|---|---|---|
| 6,456,569 B1 | 9/2002 | Stauffer | |
| 2007/0201312 A1* | 8/2007 | Watanabe | G04B 19/24 368/37 |
| 2012/0257481 A1 | 10/2012 | Hiranuma | |
| 2013/0286798 A1* | 10/2013 | Cattaneo | G04B 37/05 29/896.33 |
| 2018/0032034 A1* | 2/2018 | Vuille | G04B 47/04 |

FOREIGN PATENT DOCUMENTS

| | | |
|---|---|---|
| CN | 202230308 U | 5/2012 |
| CN | 102681419 A | 9/2012 |
| CN | 102681421 A | 9/2012 |
| CN | 104166341 A | 11/2014 |
| CN | 105278317 A | 1/2016 |
| CN | 107656433 A | 2/2018 |
| CN | 208002255 U | 10/2018 |
| CN | 109955637 A | 7/2019 |
| CN | 110275422 A | 9/2019 |
| EP | 1 046 968 A1 | 10/2000 |
| GB | 1 486 059 A | 9/1977 |
| JP | 36-3790 | 2/1961 |
| JP | 54-139759 A | 10/1979 |
| JP | 2003-43166 A | 2/2003 |
| JP | 2005-164262 A | 6/2005 |
| JP | 2013-108904 A | 6/2013 |

OTHER PUBLICATIONS

Japanese Notice of Reasons for Refusal issued Sep. 12, 2023 in Japanese Patent Application No. 2022-521102 (with unedited computer-generated English Translation), 9 pages.
Combined Chinese Office Action and Search Report issued Jan. 21, 2024 in Chinese Patent Application No. 202080078471.8 (with English translation), 12 pages.
Korean Office Action issued Mar. 22, 2024 in Korean Patent Application No. 10-2022-7014962 (with English translation), 9 pages.
International Search Report issued Jan. 27, 2021 in PCT/EP2020/081189 filed on Nov. 5, 2020, 2 pages.
Combined Chinese Office Action and Search Report issued Oct. 26, 2024, in corresponding Chinese Patent Application No. 202080078471.8 (with Partial English Translation and English Translation of Category of Cited Documents), 8 pages.

* cited by examiner

DEVICE FOR FASTENING A DISC

CROSS-REFERENCE TO RELATED APPLICATIONS

The present application is a national stage entry of International Application No. PCT/EP2020/081189, filed Nov. 5, 2020, which claims priority to European Patent Application No. 19208899.5, filed on Nov. 13, 2019, the entire content and disclosure of each of which are incorporated by reference herein.

TECHNICAL FIELD

The technical field of the present invention relates to the disk fastening devices and in particular a date disk.

TECHNOLOGICAL BACKGROUND

Some display elements are made of precious materials with tolerances that are inherent in the manufacturing process, and they are fastened to movements, which are made of other materials with other processes which also have their own tolerances.

Therefore, an adjustment is necessary so that the two parts can be assembled, which requires a lot of precision and sometimes the parts which are not suitable are discarded.

SUMMARY OF THE INVENTION

Accordingly, the present invention proposes to totally or partially overcome the drawbacks mentioned above via a split ring to fasten at least one display element of a watch, configured to display at least one information item, on at least one movement of a watch, said split ring being configured to be deformed and to adapt to said at least one display element so as to fasten said at least one display element to said at least one movement.

Thanks to this arrangement, the tolerances which may appear during the methods for manufacturing the parts, and in particular a display element and a movement, are taken up by said split ring.

According to one embodiment, said split ring comprises at least one rigid portion and at least one deformation portion; said at least one deformation portion being configured to be more easily deformable than said at least one rigid portion.

Thanks to this arrangement, said split ring can adapt to the contour of said at least one display element.

According to one embodiment, said split ring comprises a shoulder or a groove; said shoulder or said groove forms a housing configured to receive said at least one display element.

Thanks to this arrangement, said at least one display element can be housed and/or held by said split ring.

According to one embodiment, said split ring is a circular arc and/or a clip.

According to one embodiment, said circular arc and/or said clip has a discontinuity or an opening configured to bring the two ends of said at least one split ring closer together in a plane coplanar with said at least one split ring.

Thanks to one or the other of these previous arrangements, said split ring can be deformed in a plane.

The present invention relates to fastening device for at least one display element of a watch, the fastening device comprising at least one display element, at least one movement and at least one split ring according to any one of the preceding claims.

Thanks to this arrangement, the tolerances which may appear during the methods for manufacturing the parts, and in particular a display element and a movement, are taken up by said split ring.

The present invention relates to a fastening method for at least one display element of a watch via said fastening device according to one of the preceding claims, said fastening method comprising at least one step of:
  Providing said at least one display element, said at least one movement and said at least one split ring;
  Deforming said at least one split ring so as to adapt to said at least one display element; and
  Fastening said at least one split ring to said at least one movement.

Thanks to this arrangement, the tolerances which may appear during the methods for manufacturing the parts, and in particular a display element and a movement, are taken up by said split ring.

According to one embodiment, during the step of deforming said at least one split ring, said at least one display element is housed in said housing of said shoulder or of said groove.

Thanks to this step, said at least one display element can be housed and/or held by said split ring.

According to one embodiment, during the deformation step, said at least one split ring is deformed at said at least one deformation portion.

Thanks to this arrangement, said split ring can adapt to the contour of said at least one display element.

The embodiments and variants mentioned above can be taken individually or according to any technically possible combination.

The present invention will be well understood and the advantages thereof will also emerge in the light of the following description, given solely by way of non-limiting example and made with reference to the appended figures, in which identical reference signs correspond to elements which are structurally and/or functionally identical or similar.

BRIEF DESCRIPTION OF FIGURES

The invention will be described below in more detail using the appended drawings, given by way of non-limiting examples, in which.

DETAILED DESCRIPTION OF THE INVENTION

Figure 1:
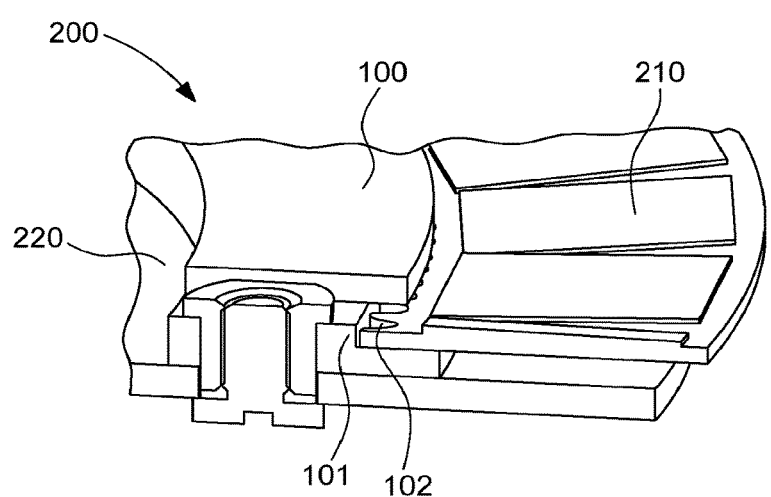
FIG. 1 represents a sectional view of a fastening device 200 according to one embodiment; and, FIG. 2 illustrates a method for fastening the split ring 100 so as to form said fastening device 200.
Figure 2:
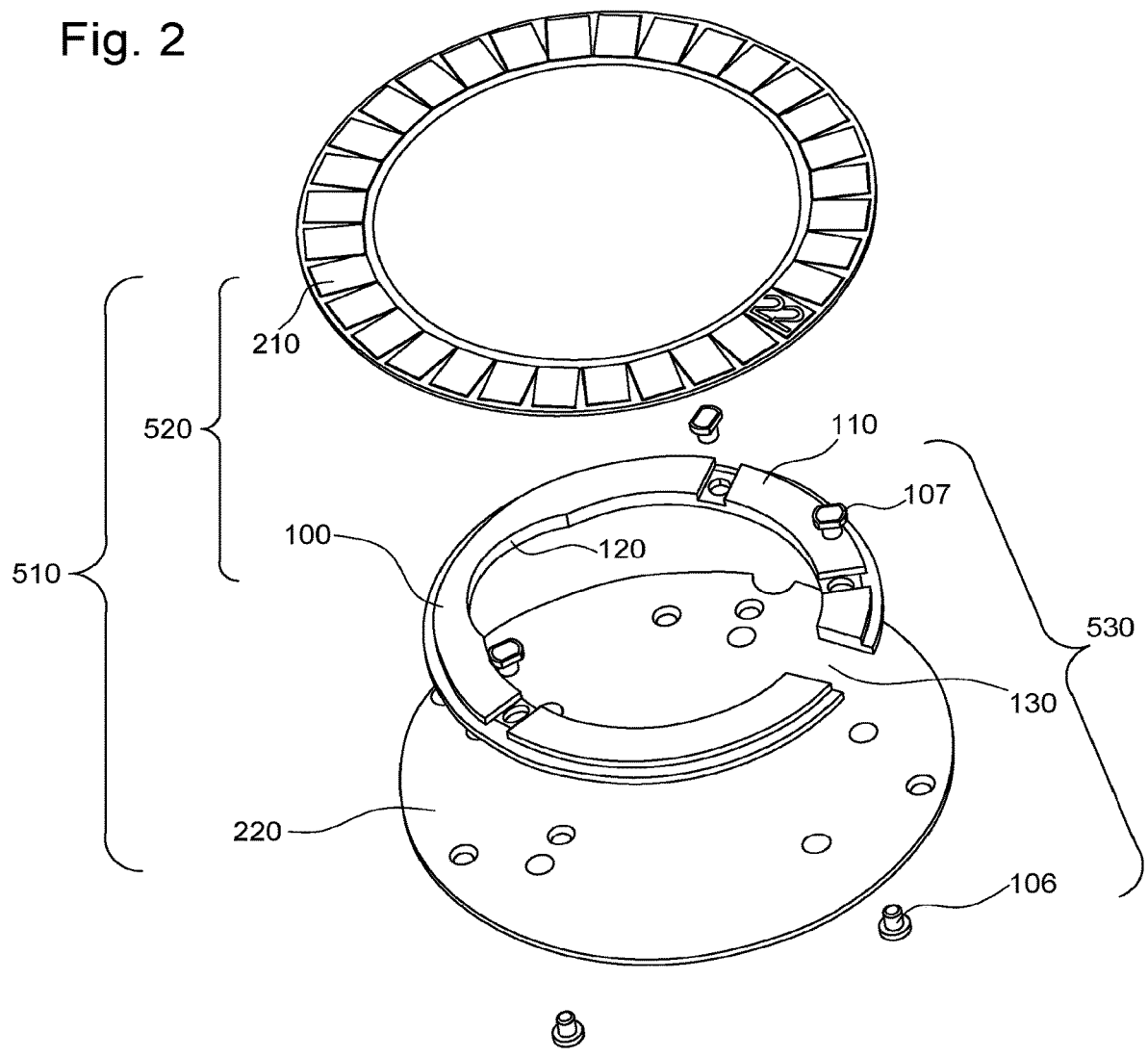

During the manufacture of certain timepieces, certain tolerances may appear and this is particularly the case of the display elements, for example calendars of the month or others, and the movements.

To this end, at least one split ring 100 is provided, which allows assembling at least one display element 210 on at least one movement 220 thanks to a fastening method 500 described below.

To do this, it is necessary to have said at least one display element 210, said at least one movement 220 and said at least one split ring 100, which have been previously provided 510.

The date disc 210, that is to say said display element 210 is inserted into said at least one split ring 100 by deforming 520 said at least one split ring 100 so as to adapt to said at least one display element 210.

Indeed, said split ring 100 comprises at least one rigid portion 110 and at least one deformation portion 120, which allows said at least one deformation portion 120 to be more easily deformable than said at least one rigid portion 110 so to adapt to the contour of said at least one display element 210.

Moreover, said at least one split ring 100 is or has the shape of a circular arc and/or a clip. This circular arc and/or clip shape has a discontinuity 130 or an opening 130, which allows by bringing the two ends of said at least one split ring 100 closer together and therefore to be deformed in a plane, preferably coplanar with said at least one split ring 100, since this deformation 520 is located at said at least one deformation portion 120 of said at least one split ring 100. Thus, by bringing the two ends closer on either side of the opening, said at least one deformation portion 120 is deformed and said at least one split ring 100 is deformed in a coplanar plane so as to facilitate the insertion of the frame, on the one hand, and on the other hand, the installation thereof in a watch case.

This is very advantageous since as said split ring 100 comprises a shoulder 101 or a groove 101 which forms a housing 102 to receive said at least one display element 210, and therefore this deformation in a plane allows inserting or housing said at least one display element 210 into said split ring 100.

Then follows the fastening 530 of said at least one split ring 100 with said at least one display element 210 to said at least one movement 220 via screws 106 and, where appropriate, screw feet 107 in order to form a fastening device 200 comprising said at least one display element 210, said at least one movement 220 and said at least one split ring 100 so as to eliminate the tolerances which may appear during the methods for manufacturing the parts, and in particular a display element 210 and a movement 220.

It should be added that said at least one split ring 100 may be inaccurate, more exactly, the contour of said at least one split ring 100 comprising said shoulder 101 or said groove 101 may have a greater tolerance relative to the diameter of said at least one display element 210. This tolerance is due thanks to said discontinuity 130 or said opening 130 of said at least one split ring 100 and to the tolerances of the plastic material composed by said at least one split ring 100, and naturally, it is by fastening said at least one split ring 100 on said at least one movement 220 that said fastening device 200 is formed and that the assembly comprising said at least one split ring 100 and said at least one display element 210 becomes more accurate.

The invention claimed is:

1. A display element comprising a date disc and a split ring for fastening said date disc of a watch, configured to display at least one information item, on at least one movement of a watch, said split ring having a C shape defining an arc shape and/or a clip shape with a discontinuity or an opening so as to have two free ends, the split ring being configured to be deformed by bringing the two ends of the split ring together and thus being deformed in a plane coplanar with the split ring and to adapt to said date disc such that a radially outer face of said split ring directly contacts a radially inner face of said date disc so as to fasten said date disc to said at least one movement.

2. The display element according to claim 1, further comprising at least one rigid portion and at least one deformation portion, said at least one deformation portion being configured to be more easily deformable than said at least one rigid portion.

3. The display element according to claim 1, further comprising a shoulder or a groove, said shoulder or said groove forms a housing configured to receive said date disc.

4. A fastening device for at least one display element of a watch, said fastening device comprising:
    at least one of the display element according to claim 1 and at least one movement.

5. A fastening method for at least one display element of a watch via said fastening device according to claim 4, said fastening method comprising at least one step of:
    providing said date disc, said at least one movement, and said at least one split ring;
    deforming said at least one split ring so as to adapt to said date disc; and
    fastening said at least one split ring to said at least one movement.

6. The fastening method according to claim 5, wherein said at least one split ring includes a shoulder or a groove, said shoulder or said groove forms a housing configured to receive said date disc, and wherein during the step of deforming said at least one split ring, said date disc is housed in said housing of said shoulder or of said groove.

7. The fastening method according to claim 5, wherein, during the deformation step, said at least one split ring is deformed at at least one deformation portion.

8. The fastening method according to claim 7, wherein said at least one split ring includes a discontinuity or an opening and wherein, during the deformation step, said at least one split ring is deformed at said at least one deformation portion when two ends of said at least one split ring are on either side of said discontinuity or of said opening.

* * * * *